(12) United States Patent
Vaha-Sipila

(10) Patent No.: US 8,629,904 B2
(45) Date of Patent: Jan. 14, 2014

(54) ARRANGEMENT FOR PRESENTING INFORMATION ON A DISPLAY

(75) Inventor: Antti Vaha-Sipila, Helsinki (FI)

(73) Assignee: Nokia Corporation, Espoo (FI)

( * ) Notice: Subject to any disclaimer, the term of this patent is extended or adjusted under 35 U.S.C. 154(b) by 1878 days.

(21) Appl. No.: 11/007,779

(22) Filed: Dec. 7, 2004

(65) Prior Publication Data

US 2005/0206654 A1    Sep. 22, 2005

(30) Foreign Application Priority Data

Dec. 12, 2003 (FI) .......................................... 035236

(51) Int. Cl.
*H04N 7/18* (2006.01)

(52) U.S. Cl.
USPC ....................................................... 348/135

(58) Field of Classification Search
USPC ....................................................... 348/135
See application file for complete search history.

(56) References Cited

U.S. PATENT DOCUMENTS

| | | | |
|---|---|---|---|
| 5,341,435 A * | 8/1994 | Corbett et al. ................. | 382/103 |
| 6,023,241 A | 2/2000 | Clapper | |
| 6,282,362 B1 * | 8/2001 | Murphy et al. ................. | 386/46 |
| 6,766,528 B1 | 7/2004 | Kim et al. | |
| 2001/0006372 A1 * | 7/2001 | Lemelson et al. .............. | 342/45 |
| 2003/0038891 A1 | 2/2003 | Polgar et al. | |
| 2004/0006509 A1 | 1/2004 | Mannik et al. | |

FOREIGN PATENT DOCUMENTS

| | | |
|---|---|---|
| DE | 10056846 | 6/2001 |
| EP | 1128629 | 8/2001 |
| EP | 1215509 | 6/2002 |
| EP | 1 349 363 A2 | 10/2003 |
| JP | 05-232372 | 9/1993 |
| JP | 2001-169164 | 6/2001 |
| JP | 2001-211364 | 8/2001 |
| JP | 2003-078785 | 3/2003 |
| JP | 2003-174578 | 6/2003 |

OTHER PUBLICATIONS

"An Architecture for Outdoor Wearable Computers to Support Augmented Reality and Multimedia Applications;" W. Piekarski et al.; Australia.
"A Touring Machine: Prototyping 3D Mobile Augmented Reality Systems for Exploring the Urban Environment;" Steven Feiner et al.; Proc ISWC '97 (Int. Symp. on Wearable Computing), Cambridge, MA, Oct. 13-14, 1997, pp. 74-81.
Office Action for related European Application No. 04 805 215.3 dated Apr. 30, 2012, pp. 1-5.
Communication pursuant to Article 94(3) EPC for European Application No. 04 805 215.3-2202, dated Dec. 3, 2012.
Communication pursuant to Article 94(3) EPC for related European Patent Application No. 04 805 215.3-1902, dated Jun. 20, 2013, 4 pages.

* cited by examiner

*Primary Examiner* — Richard Torrente
(74) *Attorney, Agent, or Firm* — Ditthavong Mori & Steiner, P.C.

(57) ABSTRACT

The invention relates to a device with an image sensor for forming image information about the environment of the device, comprising at least one object, wherein the image information comprises an image of the object. The device also comprises a display for displaying a view of the environment of the device, positioning means for determining the position of the device, and at least one set of communication means that comprise a receiver for receiving information related to the one object (14), including the position of the object. The device comprises a control block (8) for determining the position of the image of the object from image information intended to be displayed by the display.

9 Claims, 7 Drawing Sheets

ARRANGEMENT FOR PRESENTING INFORMATION ON A DISPLAY

CROSS-REFERENCE TO RELATED APPLICATIONS

This application claims priority under 35 USC §119 to Finnish Patent Application No. 20035236 filed on Dec. 12, 2003.

FIELD OF THE INVENTION

The present invention relates to a device comprising an image sensor for forming image information on the environment of the device, the environment comprising at least one object, wherein the image information comprises an image of the object; display means for displaying a view of the environment of the device; positioning means for determining the position of the device, and at least one set of communication means. The invention also relates to a system comprising a device with an image sensor for forming image information of the environment of the device, comprising at least one object, wherein the image information comprises an image of the object, and display means for displaying a view of the environment of the device, wherein the system also comprises positioning means for determining the position of the device, at least one set of communication means, and means for determining the position of the object. Furthermore, the invention relates to a method for displaying image information in a device, comprising using an image sensor to form image information on the environment of the device, the environment comprising at least one object, wherein the image information comprises an image of the object, displaying a view of the environment of the device, and determining the positions of the device and the object. Finally, the invention relates to a computer software product with machine executable program instructions for displaying image information in a device, wherein an image sensor is used for forming image information on the environment of the device, the environment comprising at least one object, wherein the image information comprises an image of the object for displaying a view of the environment of the device, and for determining position data of the device and the object.

BACKGROUND OF THE INVENTION

When moving in a strange place and trying to find a target, a person may be puzzled in which direction he/she should proceed and how far it still is to the target. The person may carry a map and a positioning receiver which can be used to facilitate access to the target.

Furthermore, in a situation in which a person has made an appointment with one or more other persons, it may be difficult to notice these persons, particularly if there are a lot of other people at the meeting place. In such a situation, the persons may try to find out each other's location e.g. by calling with a mobile phone. However, this requires the availability of a mobile phone as well as information about the telephone number of the person, to contact said person. Also, this normally causes phone call costs for the calling party.

Furthermore, systems are known, in which auxiliary information can be added onto image information on a display. This information to be added is, for example, an image from another image source, such as a video image, or information in text format. This is known as augmented reality system. Such systems can be used to implement, for example, partly virtual environments, in which real image information is supplemented with, for example, design information stored in a computer. In this way, it is possible to visualize, for example, the suitability of a building under design in its environment.

Arrangements are also known, in which, for example in vehicles, a view of the instrument cluster, or a part of it, is displayed on the surface of the windscreen. Thus, the driver of the vehicle does not often need to move his/her eyes onto the instrument cluster, but the most important metering data can be seen on the surface of the windscreen. This is known as a head-Up Display (HUD).

A problem in the above-presented systems is that the information to be added is stored in the device in advance. In the information to be added, e.g. the position of the device or vehicle at the time, or the environment of the position and possible changes in it, may not at all be taken into account. In said vehicle application, the information to be projected onto the surface of the windscreen is retrieved from another device in the same vehicle. Consequently, it is vehicle-specific information, wherein the content of the auxiliary information is the same, irrespective of the location and movement direction of the vehicle.

SUMMARY OF THE INVENTION

It is an aim of the present invention to provide an arrangement, in which information can be included in the information to be presented on the display of a device. The information to be presented on the display of the device is, for example, a real-time camera image, or an image of the environment from the viewfinder. Thus, in the arrangement according to the invention, it is possible to take into account, in which direction the object to be imaged is, and to identify the object on the basis of this. It is then possible to download information related to the object from the object, and to show it on the display of the device. To put it more precisely, the device according to the present invention is primarily characterized in that the data transmission means comprise a receiver for receiving information related to said at least one object, which information comprises at least information about the location of the object, and which device comprises a control block for determining the position of the image of the object from image information intended to be displayed by the display means, and for displaying at least a part of the information relating to the object in the image information to be displayed by the display means in connection with the image of the object.

The system according to the invention is primarily characterized in that the system comprises:
  means for receiving information related to said at least one object, the information comprising at least said information about the position of the object,
  means for determining the position of the image of the object from image information intended to be displayed by the display means, and
means for displaying at least a part of the information related to the object in the image information to be displayed by the display means in connection with the image of the object.

The method according to the invention is primarily characterized in also receiving information relating to said at least one object in the device, the information comprising at least said information about the position of the object; determining the position of the image of the object from the image information intended to be displayed by the display means; and presenting at least a part of the information related to the object in the image information to be displayed by the display means in connection with the image of the object.

Finally, the computer software product according to the invention is primarily characterized in that the computer software product also comprises machine executable program instructions:

for receiving information related to said at least one object in the device, the information comprising at least said information about the position of the object, for determining the position of the image of the object from image information intended to be displayed by the display means, and for displaying at least a part of the information related to the object in the image information to be displayed by the display means in connection with the image of the object.

The present invention shows advantages over solutions of prior art. In the arrangement according to the invention, an object to be imaged can be provided with information in such a way that the position of the information on the display indicates the object in question. In this way, the user of the device, such as a person looking for a person or a target, can find the desired person or target more easily by looking at the display of the device and, if necessary, by turning the camera in the device or connected with it, in different directions. Thus, when the desired target appears on the display, the information transmitted by the object can be displayed on the display of the device used by the searching person. It is thus easier to find persons, particularly in a crowd. Furthermore, information related to the object displayed on the image can be presented on the display of the device. For example, if the object is an automatic drink vending machine, e.g. the selection of drinks included in the object, price data etc. can be displayed on the display of the user's device. By the arrangement according to the invention, the user of the device can obtain information in the image displayed on the display and/or in the viewfinder already before recording the image. This information can also be stored in connection with the image to be taken, wherein this information can be used, e.g. in a photo album, for finding images and for displaying events at the time of recording the image.

In the arrangement according to one embodiment of the invention, a part of a larger object (e.g. an attraction) can be viewed in more detail. When the angle of the lens, the location and the position of the device are known, it is possible to compute, which part of the object is visible on the display or in the viewfinder. A larger object can thus be easily observed e.g. by walking into different places or by approaching it. The information can be changed and expanded according to where the user of the device is at the time, in relation to the object to be observed.

DESCRIPTION OF THE DRAWINGS

In the following, the invention will be described in more detail with reference to the appended drawings, in which.

DETAILED DESCRIPTION OF THE INVENTION

Figure 1:
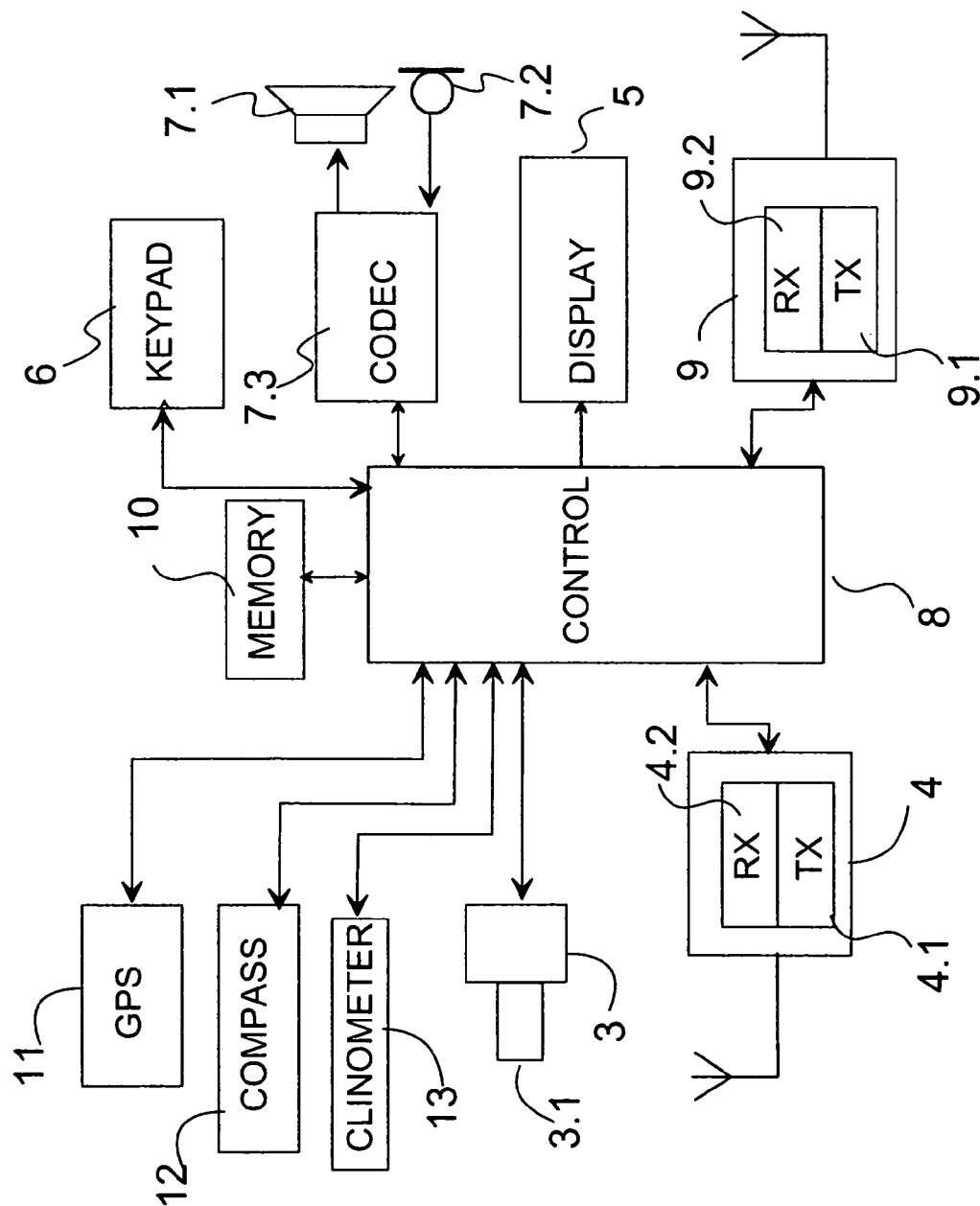
FIG. 1 shows a device according to one embodiment of the invention in a reduced chart.

FIG. 1 shows a device 2 according to one embodiment of the invention in a reduced block chart. The device 2 comprises an image sensor 3, or the like, for recording images, or an image sensor or a digital camera for recording images can be connected to the device 2. Furthermore, the device 2 comprises at least one set of communication means 4, including a transmitter 4.1 and a receiver 4.2. The device 2 also comprises a display 5 for displaying visual information. Moreover, the device 2 comprises a keypad 6 for entering data, for controlling the recording of images, etc. The device 2 may also comprise audio means 7, such as an earpiece 7.1 and a microphone 7.2, and possibly also a codec for encoding and decoding audio information, if necessary. The device 2 also comprises a control block 8 for controlling the functions of the device 2. The control block 8 comprises, for example, one or more processors (CPU, DSP). Furthermore, the device 2 of FIG. 1 comprises second communication means 9, such as local communication means complying with the Bluetooth™ system, the WLAN system or another a communication system suitable for the purpose and particularly intended for local use, for setting up a data transmission connection with another corresponding device. Furthermore, the device 2 comprises a memory 10 for storing information, programs, etc. For determining the position of the device 2, the device may comprise a positioning receiver 11, such as a receiver of the Global Positioning System (GPS). Finally, for determining the orientation (compass heading) of the device, the device 2 is provided with an electronic compass 12, or the like, which can be used to determine the heading of the device 2 at each time and possibly also its angle of inclination to e.g. the horizontal direction.

Figure 2:
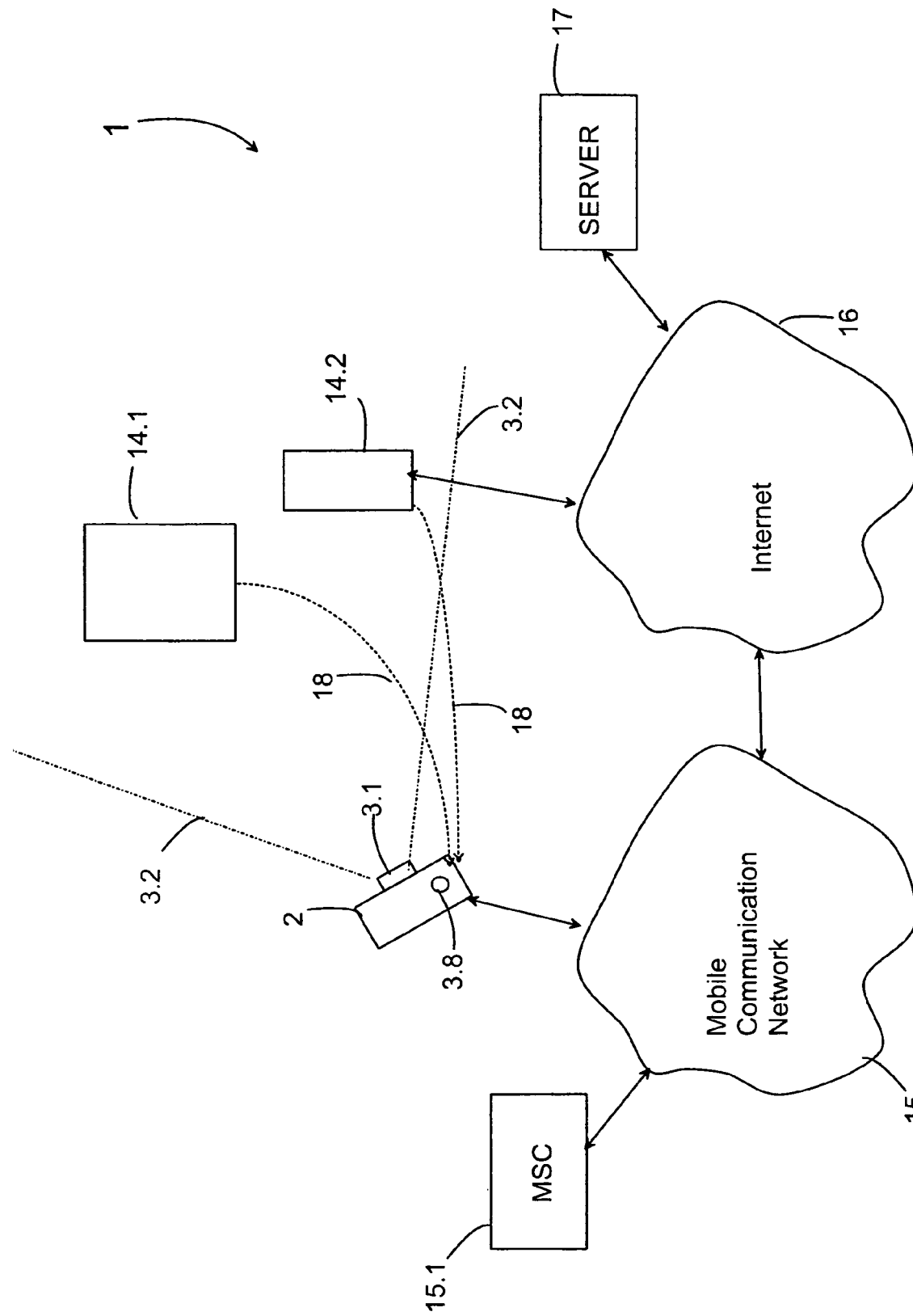
FIG. 2 shows a system according to an embodiment of the invention in a reduced chart.
Figure 5:
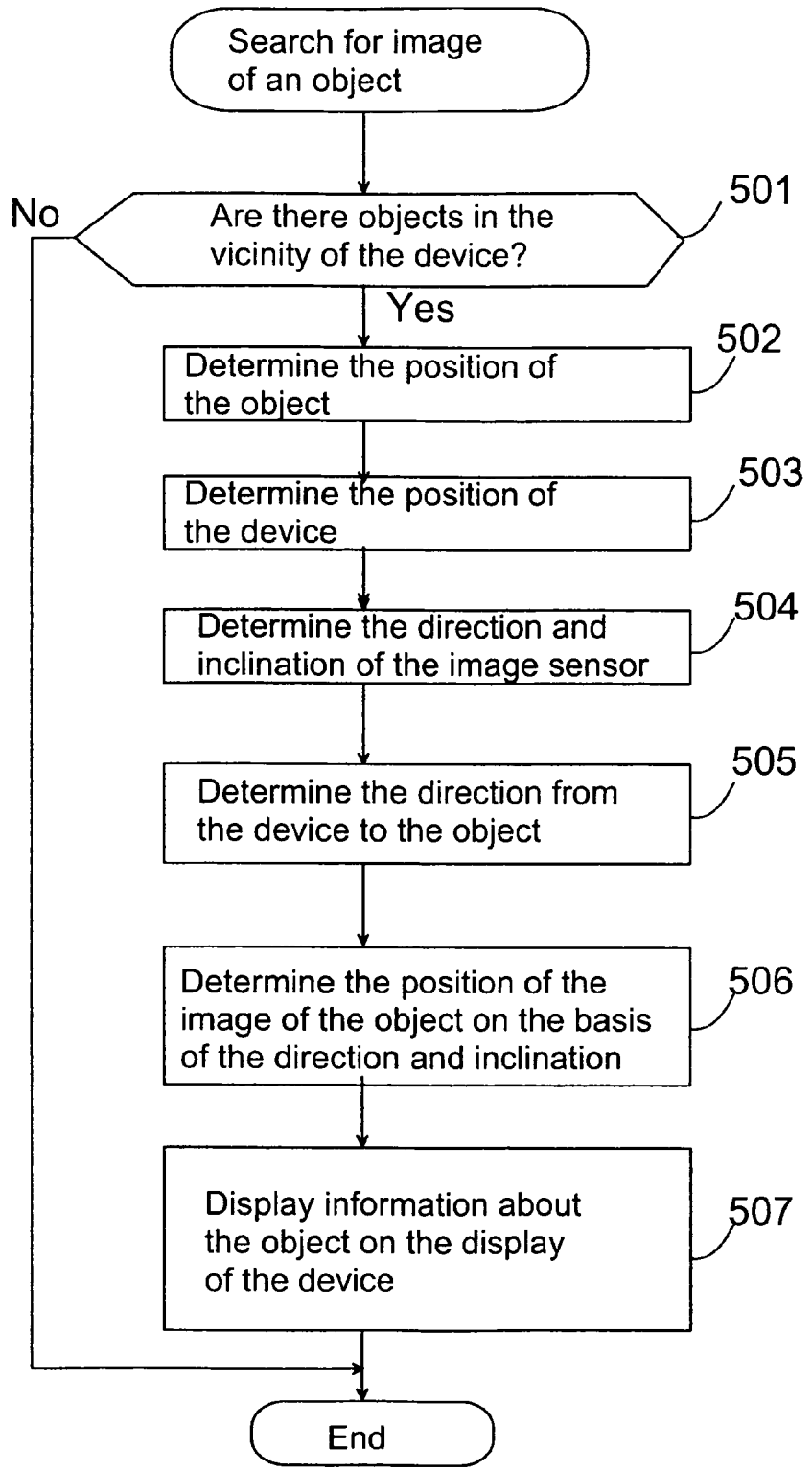
FIG. 5 shows the operation of the method according to one embodiment of the invention in a reduced flow chart.
Figure 6:
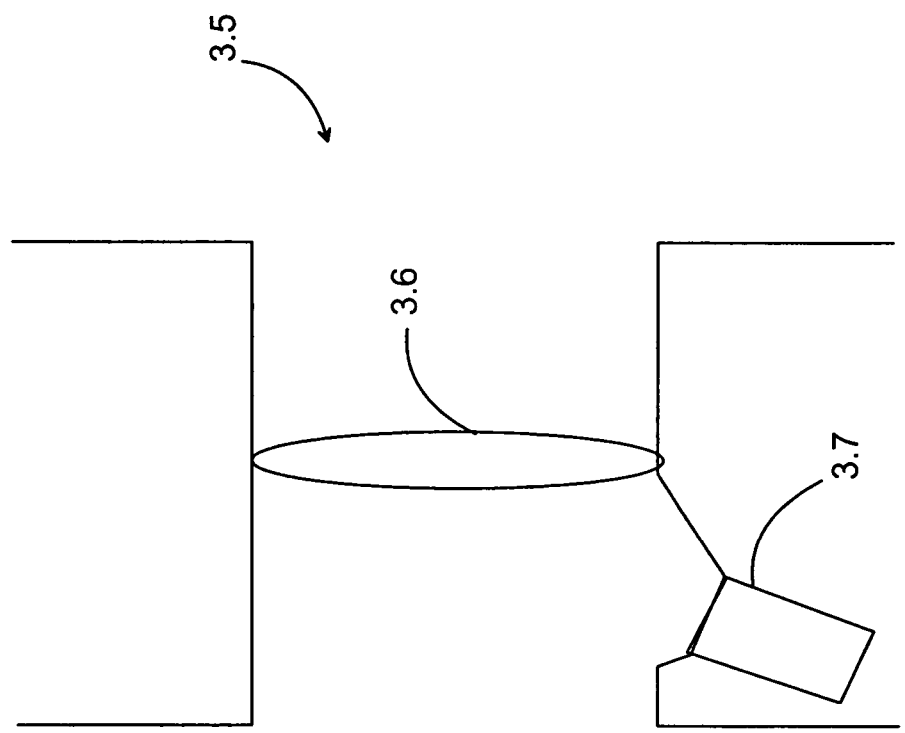
FIG. 6 is a reduced chart showing a data display application to be used in connection with another embodiment of the invention.
Figure 6:
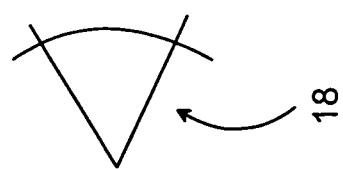

We shall now describe the function of the device 2 in the system 1 of FIG. 2, with reference to the flow chart of FIG. 5. The user of the device 2 starts e.g. the viewfinder function, wherein the image taken by the image sensor 3 is displayed on the display 5 substantially in real time. This image to be presented on the display corresponds to a kind of image information presented by the viewfinder of a camera. On the other hand, a conventional optical viewfinder 3.5 (FIG. 6) can be used as the viewfinder, wherein the display 5 is not necessarily needed for performing the viewfinder function. The viewfinder function is started, for example, by pressing the shutter release button 3.8 slightly, e.g. halfway down, and keeping the shutter release button 3.8 in this position. After this, the device 2 starts to determine 501, e.g. by listening with the receiver 9.2 of the second communication means 9, if there is another device with corresponding local communication means in the vicinity, and to try to receive 502 a signal transmitted by the local communication means of such a device. If such a device is found, the reception of the signal is started. The received signal is demodulated, and the information transmitted in the signal is stored in the memory 10 of the device 2. This received information comprises, for example, device identification data (e.g. device name) and also position data of the device, such as the position coordinates. The position coordinates are given, for example, in three dimensions, i.e. the location with two coordinates (x, y) and the height e.g. from the sea level. The device 2 also determines 503 the position of the device itself, for example, by means of a positioning receiver 11. In some cases, the position of the device 2 can also be determined e.g. by means of a mobile communication network 15. In this case, the position can be determined either in the device 2 or in the mobile communication network 15.

FIG. 2 also illustrates a situation in which there are several objects 14.1, 14.2, 14.2 visible in the image of the image sensor. In FIG. 2, the edges of the image area seen by the image sensor are illustrated with broken lines 3.2, wherein the objects between these edges 3.2 are within the image area.

After the necessary position data is available in the device 2, it is possible to determine 505 the direction vector from the device 2 to the other device 14 in the vicinity. However, this data does not fully indicate the position of the image sensor 3 with respect to the object, that is, if the second device 14 is within the image area of the image sensor 13 and, in the positive case, in which part of the image area it is. Thus, the device 2 may try to find out the compass heading of the image sensor 3, i.e. the point of compass pointed by the lens 3.1 of the image sensor. This compass heading can also be called the direction of viewing, because via the viewfinder, the user sees a view whose centre is substantially in the compass heading. The direction of viewing can be determined, for example, by means of the electronic compass 12 of the device 2. The electronic compass 12 transmits the data about the compass heading of the image sensor to the control block 8. On the basis of the collected data, it can be determined 506 e.g. in the control block 8, which point in the image taken by the image sensor 3 is the location of the second device 14. This point can be determined e.g. as the directional angle to the centre of the image area. If, in addition to the x,y coordinates, the height difference between the device 2 and the second device 14 is also known, as well as the angle of inclination of the image sensor 3, i.e. its position with respect to the horizontal direction, it is also possible to determine 504, at some precision, the height of the image of the second device 14 in the image formed by the image sensor. This is possible by computation, using the position coordinates given by the second device 14, the position coordinates of the device 2 itself, and the orientation data.

The device 2 may also comprise, e.g. in connection with the electronic compass 12, a clinometer 13 which indicates the inclination of e.g. the device 2 and the deviation of the centre line of the image area visible to the image sensor 3 e.g. with respect to the horizontal direction, or the angle of inclination with respect to the horizontal plane. Thus, the orientation of the device 2 can be determined, in addition to the compass heading, also in the height direction, wherein the compass heading and the angle of inclination of the centre line of the image area visible to the image sensor 3 (direction of viewing) can be determined and this data of the object 14 can be used to determine the position of the image 14' formed in the image area 3.4 from the image information to be displayed on the display 5 of the device 2. It is assumed here that the image sensor 3 is fixed with respect to the device 2, but it is obvious that an image sensor separate from the device 2 can be used as well. In such a case, the angle of inclination and the direction of viewing are measured with respect to the image sensor 3 so that this data can be used to find the images of the objects in the image information formed in the image sensor 3.

Figure 3:
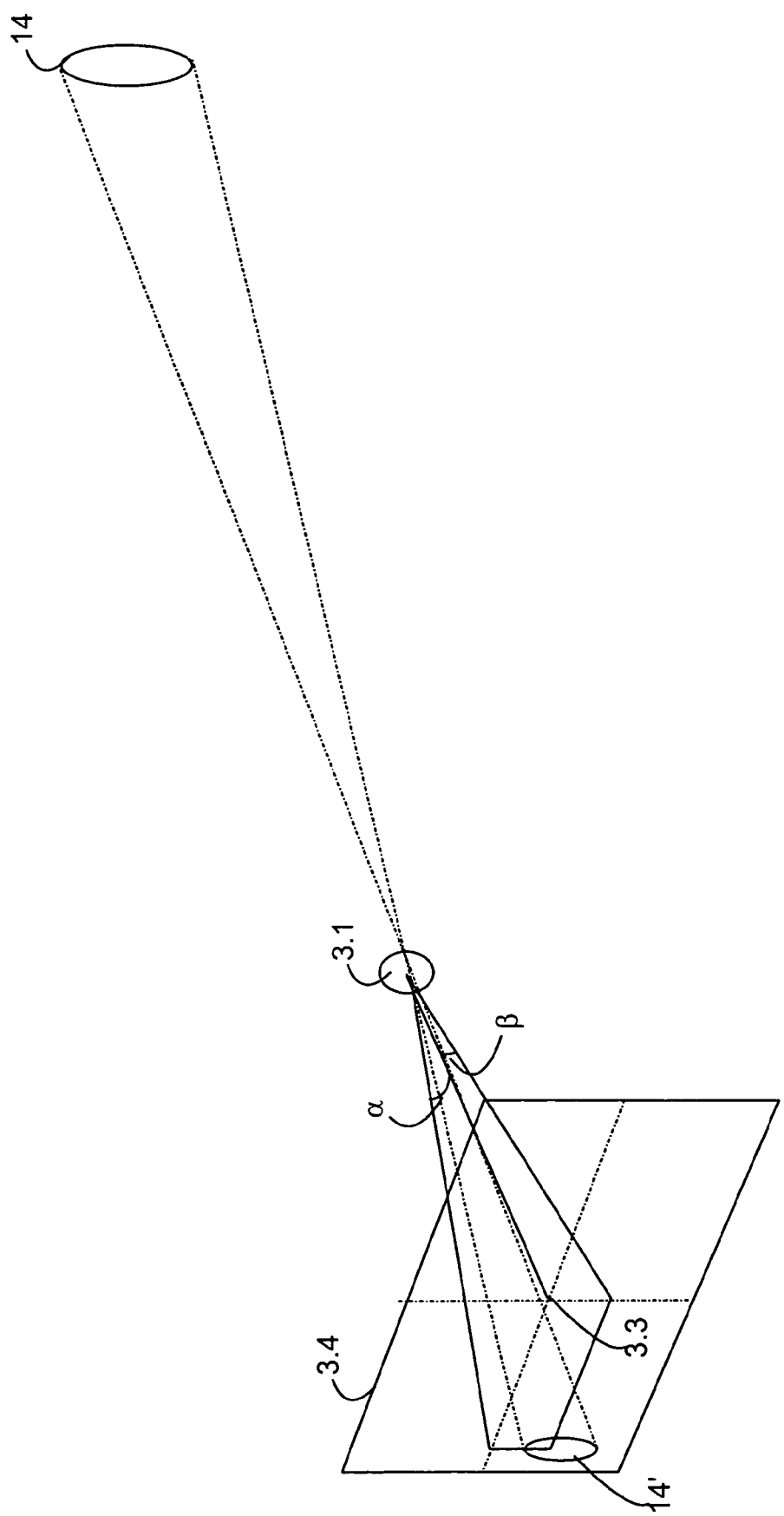
FIG. 3 illustrates the positioning of an object in the image displayed by the device.

FIG. 3 illustrates the determination of the position of the image 14' formed of the object 14 in the image area 3.4. In FIG. 3, angle $\alpha$ represents the lateral deviation of the image 14' formed of the image 14 from the direction of viewing, or from the centre line 3.3 of the image area 3.4 visible to the image sensor 3. Accordingly, angle $\beta$ represents the vertical deviation of the image 14' formed of the object 14 from the centre line 3.3 of the image area 3.4.

After the position of the image 14' of the object 14 has been determined, it is possible to display 507 information related to the object 14, i.e. the second device, on the display 5 of the device 2. This information, or a part of it, is displayed on the display 5 of the device 2 close to the point where the image 14' of the object 14 has been found to be.

Figure 4A:
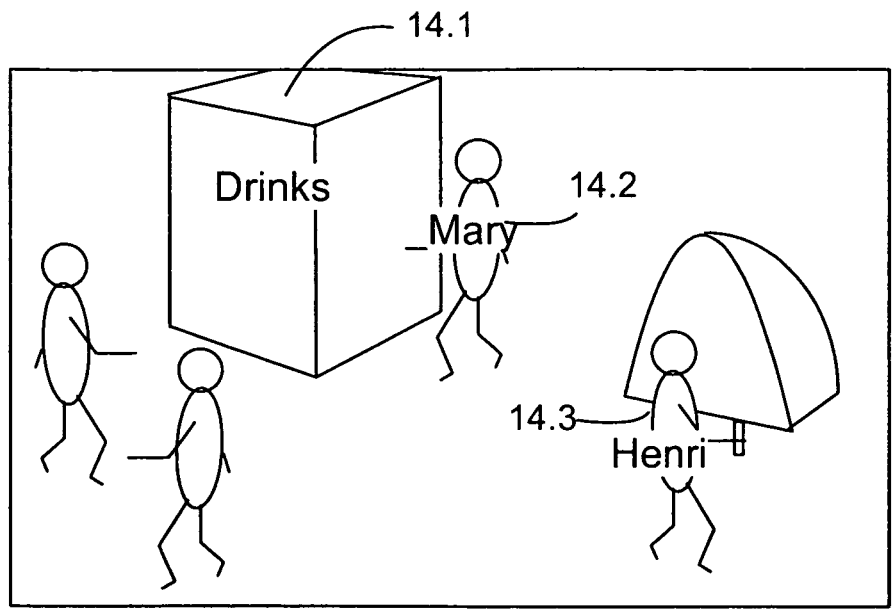
FIGS. 4a to 4d show some examples of applying the invention.

For example, the information is displayed on the image of the object 14, as shown in FIG. 4a. The information can be, for example, the name of the object 14, the name of the user of the second device, the coordinate data of the object, etc. The information has been received from, for example, the object 14, a server 17 connected to a communication network 16, a mobile switching centre 15.1, or the like.

If there are several other objects 14 with corresponding local communication means in the vicinity of the device 2, the device 2 can be used to receive the signals transmitted by more than one such object 14, as well as information transmitted in the signals, wherein the above-presented measures can be taken for each such object 14. Thus, also information relating to several objects 14 in the vicinity of the device 2, such as the name of the object or the user of the device in the object, can be displayed simultaneously on the display 5 of the device 2. Such a function can be used, for example, in a situation in which a person tries to find, in a crowd, a person or several persons with whom the person using the device 2 has, for example, a rendezvous in a meeting place. Thus, the user of the device 2 can observe the environment by using the image sensor 3 of the device 2, and turn the image sensor 3 in different directions, wherein when the image of an object 14, from which information has been transmitted to the device 2, appears on the display 5, the information transmitted by this device is displayed on the display 5 of the device 2. Thus, by studying this information, the user can find the desired person(s) in the crowd.

The above-presented embodiment of the invention can also be applied in such a way that the position data of the device 2, as well as information about the direction of viewing, is transmitted from the device 2 to e.g. a server 17. The server 17 receives information, including position data transmitted by objects 14, or determines the position of the objects 14 in another way. On the basis of this information, the server 17 can determine, which objects are within the image area 3.4 of the image sensor 3 of the device 2, and transmit information of these objects to the device 2. On the basis of this, the information, or a part of it, can be displayed on the display 5 of the device 2. The server used can also be a mobile switching centre 15.1 or another server device which can be arranged to communicate with the device 2 and the objects 14.

In yet another application of the invention, position data and other information of the objects 14 does not necessarily need to be received, but this data is stored in the server 17. This is particularly suitable for situations in which the objects 14 are not moving but they have been placed to be stationary in some location.

Figure 4B:
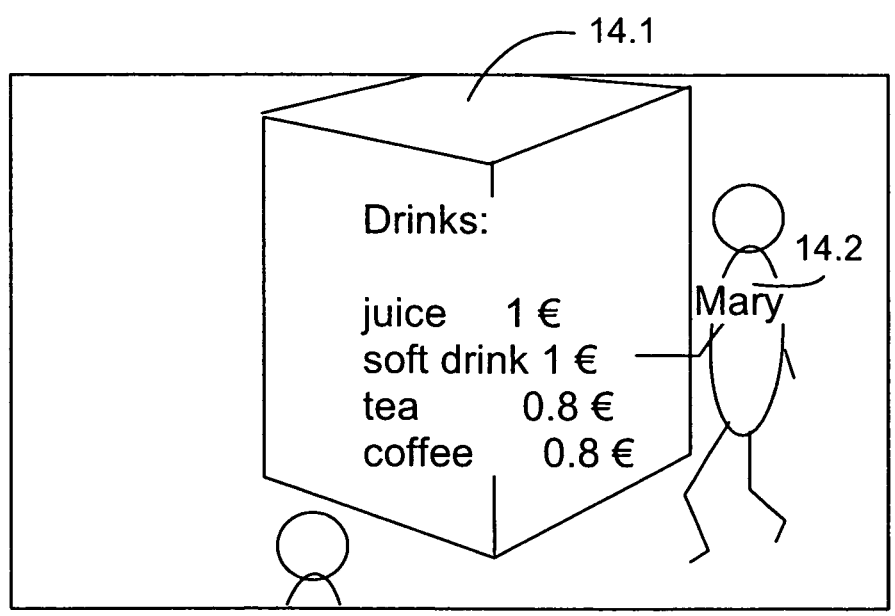

FIGS. 4a and 4b show one possible embodiment for presenting information according to the invention. A person is imaging the environment with the image sensor 3 of the device 2, and when an object with local communication means corresponding to the local communication means 9 of the device 2 appears in the image, the device 2 receives the signal transmitted by this device. This signal comprises transmitted information about e.g. the name of the object 14.1 as well as the product selection contained in the object 14.1, such as drinks and their prices in the object 14.1. If the image of the object 14.1 is relatively small, it is possible to select an item of information which is appropriate in the situation, e.g. the name or a text describing the function of the object (e.g.

automated drink vending machine, drinks, etc.). The user can move closer to the object, or if the device 2 has a zooming function, zoom the image of the object 14.1 to a larger size. When the image of the object becomes larger, a larger part of the information can be displayed on the display 5 of the device, if necessary, on the image of the object or in its direct vicinity. It can be seen in FIG. 4a that the user is relatively far from the object 14.1 (in this example, an automatic drink vending machine), wherein only the text "drinks" is displayed. In FIG. 4b, the image of the object is larger, wherein it is also possible to display information about the content of the object 14.1, in this non-restricting example case, information about drinks contained in the object 14.1, and their prices. On the basis of this information, the user of the device 2 can judge, if the automatic drink vending machine contains a drink that the user would like to buy. There may also be several such objects in the vicinity, wherein each object can communicate with the device 2 and transmit information relating to the object to the user's device 2.

Another example of changing the quantity of information according to what is visible, is a situation in which the device 2 is used to look at an object, such as the Parliament House, on the display 5, and/or information, such as the text "Parliament House", is displayed on the display 5 and/or in the viewfinder 3.5. When the user moves closer or zooms the object to a larger size and looks at a feature in the object, such as an architectural feature of the parliament house, the display 5 and/or the viewfinder 3.5 display e.g. information of the following type: "Parliament House: <description of architectural feature>".

FIG. 4a also shows several persons, of which two persons 14.2, 14.3 are carrying a device which can communicate with the device 2. Thus, the display of the device 2 also shows the names (Mary, Henri) of these persons 14.2, 14.3, which are stored in the device carried by the respective persons. In a corresponding manner, FIG. 4b shows only one person 14.2, about whom information is received in the device 2.

The invention can also be applied for notifying about the supply of other service points than automatic drink vending machines. For example, restaurants can advertise by transmitting, in addition to their coordinate data, for example the menu of the day, information about the opening times, free seats, etc. as information to the device 2. Other possible service points applying the invention include service stations, stores, theatres, etc.

Figure 4C:
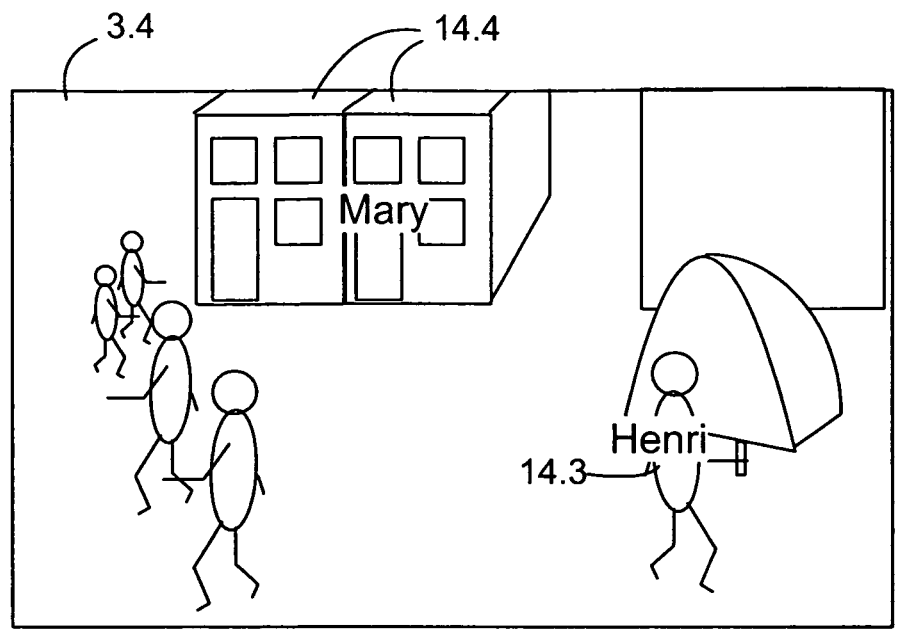
Figure 4D:
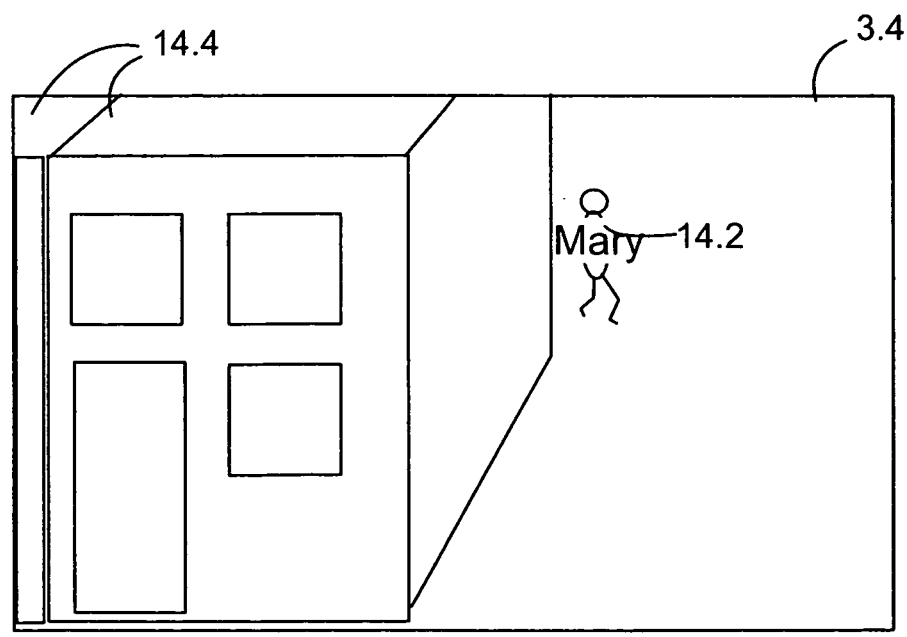

FIGS. 4c and 4d illustrate yet another example application of the invention. In FIG. 4c, the user of the device 2 is imaging the environment in a relatively wide view, wherein the objects 14 are not necessarily very distinctly visible on the display 5, and some objects may be behind another object. For example, in the situation of FIG. 4c, a person called Mary is behind the buildings 14.4, but information about the person has been received in the device 2. Consequently, information about the objects 14 can be collected and the position of the persons 14 can be determined in the image formed by the image sensor 3 and displayed on the display 5, even though the objects were not visible in the image. Thus, on the basis of the point where the information is displayed, the user can conclude the correct direction of movement to come to e.g. the object 14.2, or the person called Mary. When the user moves in the direction indicated by the information 19 and approaches it, the view around the object 14.2 becomes sharper, wherein the direction of movement can be corrected to become sharper, if necessary. This is illustrated in FIG. 4d, in which the searched person has become visible behind the buildings 14.4.

FIG. 4c also shows other people, but they are not carrying a device from which information is transmitted to the device 2. This may be due e.g. to the fact that the devices which they are possibly carrying do not apply the present invention, or the persons have forbidden the transmission of information, or the transmission of information is allowed, by definition, to such a device 2 only, whose identifier (name) is among given allowed names.

In addition to the above-presented viewfinder function, the invention can also be applied in connection with the recording of images. In this case, the viewfinder function can be used, if necessary, to present information on the display and/or in the viewfinder, and, in connection with the recording of the image, this information can be stored as an image specification to be stored in connection with the image. For taking images, for example, the shutter release button 3.8 is pressed to the lowest position. The information is not necessarily stored permanently on the image but in such a way that the image can be displayed either with or without the information. The user can make photo albums of the images stored with visible information related to the image, such as information about the place and time of recording the image, objects visible in the image, such as names of persons, names of service points, etc. It is thus easier to search for the stored images, for example, by using the information attached to the images.

As already stated above, in the present invention it is also possible to apply other methods than short-distance data transmission in the communication between the device 2 and the objects 14. For example, a mobile communication network 15 and/or the Internet data network 16 can be used, wherein information is transmitted between the device 2 and the objects 14 via the mobile communication network 15, the Internet data network 17, and/or another remote communication network. Thus, the second communication means 9 intended for short-distance data transmission are not necessarily needed in the device 2 and/or in the objects 14.

In the invention, the viewfinder function can be implemented, for example, by displaying the view on the display 5 of the device 2, wherein the information is also displayed on the display 5. Another possibility is to use a conventional optical viewfinder 3.5 in the viewfinder functions, wherein this optical viewfinder 3.5 is provided with means 3.7 for reflecting the information in a desired point in the viewfinder in such a way that the user of the device 2 sees the information as if on the objects visible in the viewfinder. This can be implemented, for example, by projecting the information onto the surface of the lens 3.6 in the viewfinder 3.5. This embodiment is illustrated in principle in FIG. 6. In this context, it is possible, to some extent, to apply the same technology by which the view of the instrument cluster is displayed on the windscreen in some vehicles. The information can also be projected, instead of the lense 3.6 of the viewfinder, to the eye 18 of the user of the device 2 in such a way that the eye sees the information as if on the object 14.

It has been presented earlier in this description that for finding the objects 14 in the vicinity, the receiver 9.2 of the second communication means 9 of the device 2 receives signals transmitted by other devices in objects 14. Thus, the devices in the objects 14 are arranged to transmit, e.g. at regular intervals, a signal which can be received in the device 2, and from the presence of the signal, it can be concluded that there is an object 14 in the vicinity. The transmitted signal may contain information, or the signal is provided with information first upon a request from e.g. the device 2 or the server 17. The search for the objects can also be implemented in such a way that the device 2 transmits, for example by the transmitter 9.1 of the second communication means, a signal, for example an inquiry, wherein the devices of nearby objects 14 listen to the presence of such a signal, and when they detect the signal, the necessary steps are taken to transmit the information to the device 2.

The different functions of the method according to the invention can be implemented by programming, primarily in the control block 8 of the device 2. Thus, the memory 10 of the device 2 comprises stored machine-executable program instructions, under whose control the control block 8 takes the necessary steps, such as the computing steps needed for determining the position of the image 14' of the object 14, and the like.

The invention can be applied in various devices 2 and systems 1. Some non-restrictive examples to be mentioned of such devices 2 include portable communication means, such as mobile communication means, digital cameras and video cameras.

It will be obvious that the present invention is not limited solely to the above-presented embodiments but it can be modified within the scope of the appended claims.

What is claimed is:

1. An apparatus comprising:
   an image sensor for forming real time image information of the environment of the apparatus, with at least one object, wherein the image information comprises an image of the object,
   a display for displaying said real time image information of the environment of the apparatus,
   a positioning receiver configured to determine the position of the apparatus, whereby the apparatus determines the position of the apparatus itself,
   a receiver for receiving information relating to said at least one object from said at least one object, which information comprises at least information about the position of the object, and
   a control block for
      determining the direction and inclination of the image sensor;
      determining the direction from the apparatus to the image of the object; and
      determining the position of the image of the object based on the direction and inclination;
      wherein the display comprises an optical viewfinder and displays at least a part of the information relating to said at least one object by adding the at least a part of the information relating to said at least one object into the image information displayed by the optical viewfinder in association with the image of the object prior to any recording of the image of the object.

2. The apparatus according to claim 1, comprising a compass configured to determine the direction of viewing of the image sensor, wherein the direction of viewing is configured to be used, in addition to the position data of the apparatus and the object, to determine the position of the image of the object from the image information displayed by the display.

3. The apparatus according to claim 2, comprising an inclination measuring block configured to determine the inclination of the image sensor, wherein the inclination data of the image sensor is configured to be used in addition to the position data of the apparatus and the object and the direction of viewing, for determining the position of the image of the object from the image information displayed on the display.

4. The apparatus according to claim 1, further comprising a viewfinder function, and that image information is updated substantially continually in connection with performing the viewfinder function.

5. The apparatus according to claim 1, wherein the image information with the information relating to said at least one object attached to it is displayed on the display.

6. The apparatus of claim 1, wherein said receiver requires permission from said at least one object to be able to receive said information relating to said at least one object.

7. A method comprising:
   receiving real time image information about the environment of an apparatus, the environment comprising at least one object, wherein the image information comprises an image of the object,
   determining the position of the apparatus by the apparatus itself, the position comprising the direction and inclination of the apparatus,
   receiving information relating to said at least one object from said at least one object, the information comprising at least information about the position of the object,
   determining the position of the object with respect to the apparatus by using said information relating to said at least one object and the direction and inclination of the apparatus, and
   determining the position of the image of the object in the image information on the basis of the direction and inclination of the object, and
   displaying on a display, at least a part of the information related to the object by adding the information relating to said at least one object into the real time image information, in association with the image of the object prior to any recording of the image of the object.

8. The method according to claim 7, comprising determining the direction of viewing of an image sensor, and using the direction of viewing, in addition to the position data of the apparatus and the object, for determining the position of the image of the object from the image information displayed by the display means.

9. The method according to claim 7, comprising performing a viewfinder function, and updating image information substantially continually in connection with performing the viewfinder function.

* * * * *